United States Patent [19]
Anderson

[11] Patent Number: 4,795,018
[45] Date of Patent: Jan. 3, 1989

[54] CONTAINED TRACKWORK FOR CAN CONVEYING

[76] Inventor: Jon V. Anderson, P.O. Box 116, Ocoee, Fla. 32761

[21] Appl. No.: 41,701

[22] Filed: Apr. 22, 1987

[51] Int. Cl.⁴ ............................................. B65G 11/00
[52] U.S. Cl. ..................................... 193/2 C; 193/38; 193/44
[58] Field of Search ...................... 193/2 R, 2 C, 25 R, 193/25 A, 25 E, 25 AC, 25 FT, 33, 38, 44; 198/836, 860.3, 861.1, 398

[56] References Cited

U.S. PATENT DOCUMENTS

| | | | |
|---|---|---|---|
| 2,305,667 | 12/1942 | Brentnall | 193/38 |
| 2,704,144 | 3/1955 | Rety et al. | 193/38 |
| 2,720,302 | 10/1955 | Madden | 193/38 |
| 3,776,350 | 12/1973 | Tice | 198/836 |
| 3,850,289 | 11/1974 | Behr et al. | 198/398 |

Primary Examiner—Joseph E. Valenza
Attorney, Agent, or Firm—James H. Beusse

[57] ABSTRACT

A high speed gravity feed can conveyor comprises two facing C-shaped guides formed of hard chrome plated sheet metal. The guides are held in opposed spaced relationship by open U-shaped collars distributed along the conveyor. The collars distributed along the conveyor. The collars are formed with openings positioned downward having sufficient width to pass a can turned from a rolling orientation in the conveyor. The edges of the C-shaped guides are turned in a direction to support a rolling can and are covered with ultra-high molecular weight plastic to minimize rolling friction and protect the metal surface. The facing guide surfaces with chrome plating reduce sliding friction when a can end contacts a guide and reduce the potential for nicking the surface.

7 Claims, 3 Drawing Sheets

CONTAINED TRACKWORK FOR CAN CONVEYING

FIELD OF THE INVENTION

This invention relates to apparatus for can conveying and, more particularly, to an improved design for adjustable trackwork in a gravity feed conveyor system.

BACKGROUND OF THE INVENTION

Production line techniques used in the canning industry are continually being modified in order to improve the speed and efficiency of production. In the past, gravity feed conveyors used to rapidly transport empty cans between operating stations have comprised an open trackwork runways including guide rails or angle brackets in spaced apart parallel arrangement forming a caged runway for rolling cans. Such conveyors often comprise adjustable rails and brackets in order to adapt the runway for various sized cans.

By way of example, FIG. 1 illustrates, in cross section, a well known design for a section 10 of an adjustable width gravity feed can conveyor. The conveyor section 10 includes first and second parallel guide rails 12 and 14 between which are positioned a pair of carrier rails 16 forming a conveyor runway for a can 11. Spaced outward from the first guide rail 12 is a longitudinal supporting rail 18. The second guide rail 14, the carrier rails 16 and the suporting rail 18 are rigidly connected to one another along their length with assembly bolts 20 or other suitable fastening means which extend across the entire width of the conveyor section 10. Various sized spacers 22 are interposed between the rails 14, 16 and 18 to attain a desired spaced relationship.

The open trackwork of the conveyor section 10 is adjustable to accommodate various sized cans. The first guide rail 12 is extended from the supporting rail 18 by threaded adjustment bolts 24 which are welded to the guide rail 12 and passed through the support rail 18. Pairs of nuts 26 and washers 28, placed on the adjustment bolts 24 on opposing sides of the guide rail 12, in combination with helical springs 30, positioned along the bolts 24 between the washers 28 and the guide rail 12, are used to displace the bolts 24 and urge the rails 12 and 18 apart. This and other adjustment arrangements have proven awkward and inconvenient because of the time and difficulty involved when installing and adjusting rail spacings for different can sizes. In the beverage industry where cost competition is highly dependent on production rates, such arrangements are simply not cost effective.

In the past, the operating rates of conveyors for unfilled cans have generally been constrained to approximately 1,000 cans per minute. This is in part due to the relatively low structural strength of unsealed, i.e., open end, cans which permits deformation when the open end contacts a guide rail. More specifically, the can open end tends to have sharp edges which can impede can motion upon contact with one of the guide rails. If such contact occurs, sliding friction will tend to turn the can such that its axis of rolling rotation is not normal to the direction of motion. Forces exerted on that can by following cans will increase any can deformation and lead to a jam. In order to avoid this problem, early designs of low speed gravity feed can conveyors were improved upon by providing intermittent slots along the center of the conveyor runway. The slots permitted cans that were not directly aligned with the chuting to drop through the runway. These slots were formed by removing the support rails and replacing the guide rails with angle brackets which both supported and guided the rolling cans. However, with increased conveyor operating rates and weight reductions in metal beverage containers, can deformation has become more prevalent. Such deformation inhibits rolling and may prevent a deformed can from reaching a drop-out slot. It is therefore necessary to minimize transitions between runway support members in order to provide a smoother rolling path for lightweight cans. Even minor ridges and joints in the support rails 16 may have the effects of impeding the rolling speed of cans and deflecting cans from proper alignment.

Furthermore, in order to maximize runway speed, the surface to surface contact area between the rolling cans and the support rails should also be minimized. In the past, higher rolling speeds have been achieved by forming the support rails from half round rods 34 as illustrated in a simple form for two sections 36 and 38 of a gravity feed conveyor chute 40 in FIGS. 2 and 3. Further reductions in rolling resistance have been attained by covering the support and guide rails with a low friction plastic material such as ultra high molecular weight polyurethane. The chute 40 comprises several rigid rectangular collars 42 one of which is illustrated in the cross sectional view of FIG. 3. Rigid half round guide bars 46, covered with low friction plastic, are fastened along each collar sidewall and pairs of half round support bars 48 are fastened along the upper and lower inside surfaces of the bands 42.

Although conveyor designs similar to the chute 40 illustrated in FIGS. 2 and 3 are able to process up to 1,000 cans per minute, lightweight unsealed cans are especially prone to misalignment because their relatively sharp open edges catch on even the low friction plastic covering along the guide bars 46. As a result, even at relatively low process rates, e.g., less than 800 cans per minute, cans tend to misalign. Furthermore, the rectangular collars 42 may interfere with misaligned cans, sometimes preventing them from freely dropping through runway slots and causing the misaligned cans to jam up the can procession. Efforts by conveyor personnel to remove problematic cans with poles, with conduit pipe or by walking on the conveyor trackwork, often result in bending of the guiding and support rails which, in turn, further contributes to can misalignment.

Other drawbacks of conventional can conveying apparatus include the time required for installing and readjusting the rails to provide smooth runway transitions between adjacent sections of conveyor trackwork. In addition, numerous adjustment bolts along each section must be loosened and tightened in order to modify guide rail spacings when can sizes are changed. Another disadvantage of the conventional apparatus results from the relatively low structural strength of trackwork sections. This causes long runs of gravity feed conveyor chuting to sag. Extensive bracing in the form of support hangers is commonly installed to counter the large moment arms on extended chute lengths and to prevent misalignment of conveyor rails. These structural drawbacks require that substantial time be spent during conveyor set up in order to assure proper alignment. Furthermore, as a result of the extensive bracing required to support the trackwork, conventional conveyor apparatus for can processing does not possess the simple and clean appearance characteristic of good conveyor design.

Generally, prior art arrangements for gravity feed can conveyor trackwork are believed to have several limitations affecting their suitability for high speed, cost effective processing of light weight cans such as the various sized aluminum containers used by the beverage industry. In particular, it is desirable to operate gravity feed conveyors at rates which move beverage containers through processing plants at rates in excess of 1,500 cans per minute.

SUMMARY OF THE INVENTION

It is an object of the present invention to provide an improved can conveying device which can be adjusted in a fast, cost effective manner to accommodate various sized cans.

It is another object of the present invention to provide an improved gravity feed can conveying device which processes unsealed cans at higher rates than heretofore known.

It is a another object of the present invention to provide an improved can conveying device which moves open cans through contained trackwork thereby reducing the likelihood of contamination during the canning process.

It is a further object of the present invention to provide a can conveying device which is relatively rigid, inflexible and not prone to misalignment.

It is still another object of the present invention to provide a can conveying device comprising rigid support collars which do not interfere with misaligned cans.

In one form, the present invention comprises first and second elongate "C" shaped guides rigidly connected in spaced apart symmetric relation with one another to form a section of contained trackwork for high speed movement of rolling cans. A continuous longitudinal slot between the guides permits misaligned cans to freely drop out of the trackwork. Novel "U" shaped collars rigidly connect the guide members to one another. The collars are open along the runway path to avoid interference with misaligned cans as they drop out of the trackwork.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
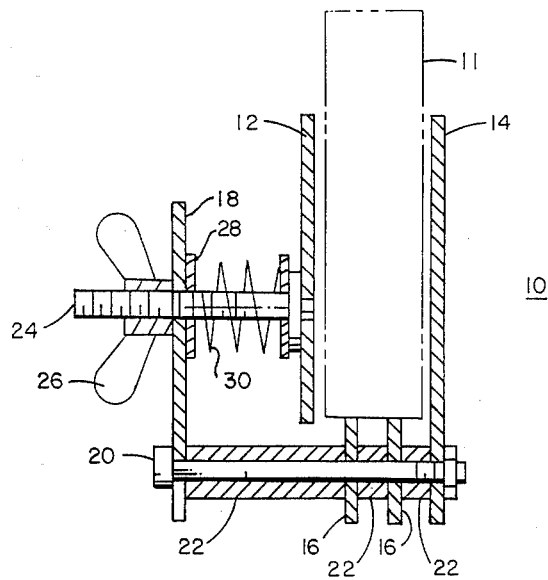
FIG. 1 is a cross-sectional view of a prior art design for an adjustable width gravity feed can conveyor.
Figure 2:
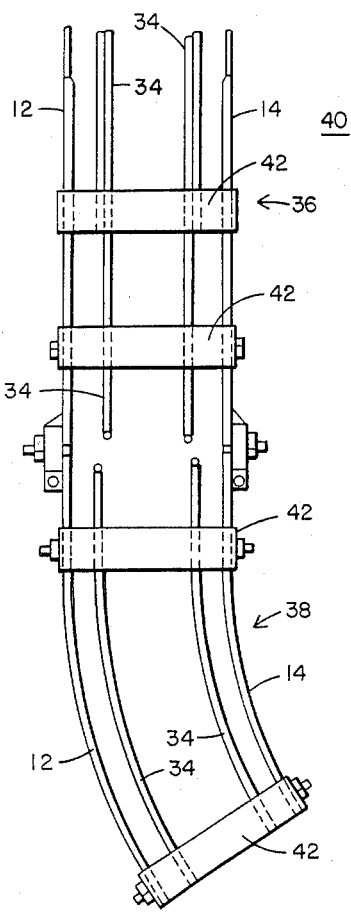
FIG. 2 is a plan view illustrating two sections of another gravity feed conveyor known in the prior art.
Figure 3:
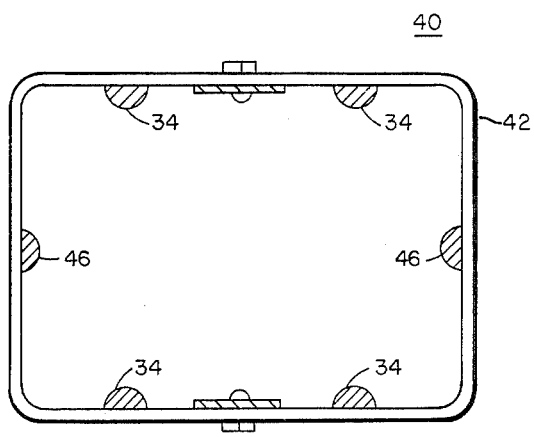
FIG. 3 is a cross-sectional view of the gravity feed conveyor illustrated in FIG. 2.
Figure 4:
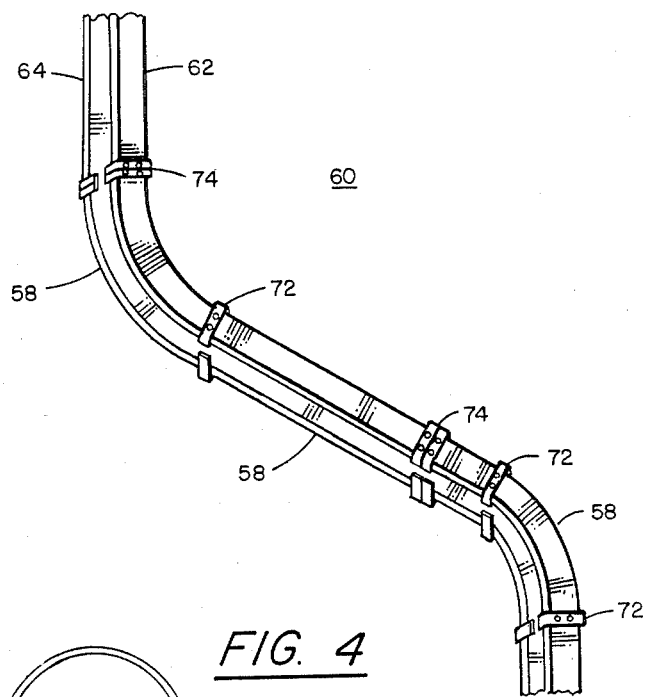
FIG. 4 is a perspective view of a section of gravity feed can conveyor in accordance with the present invention.
Figure 6:
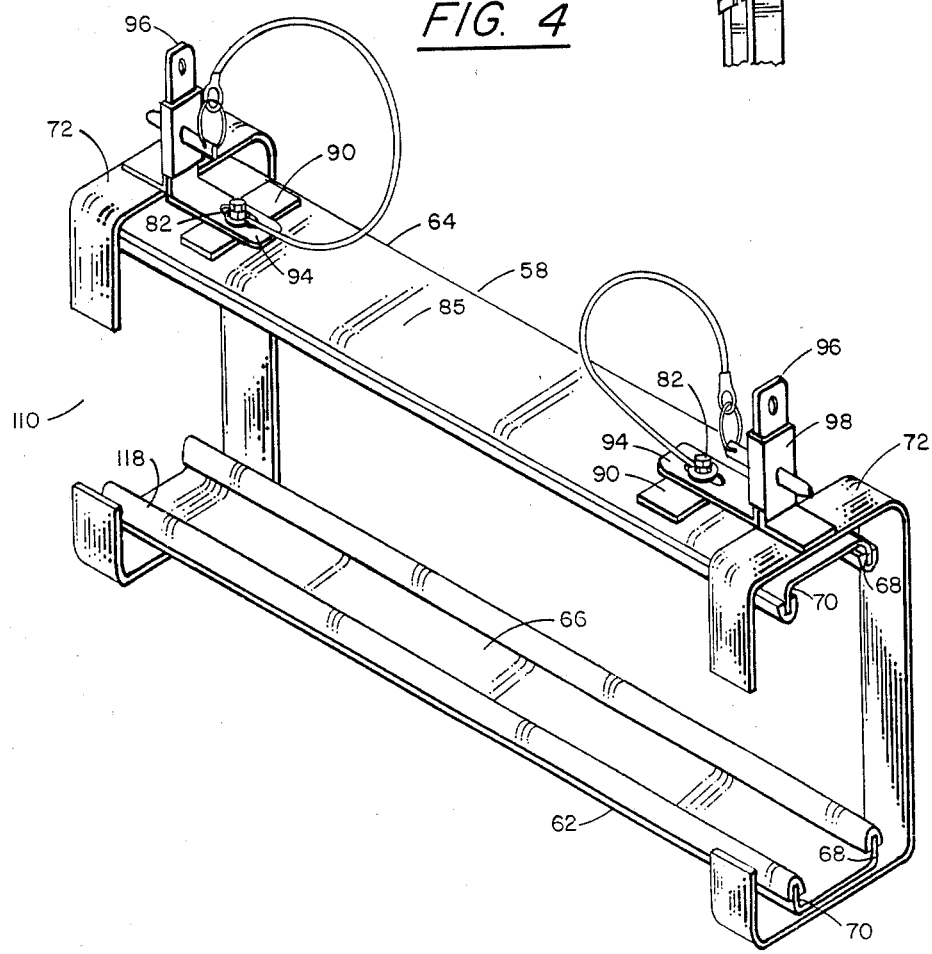
FIG. 6 is a perspective view illustrating details of an adjustment mechanism and the contained track work in one form of the present invention.
Figure 5:
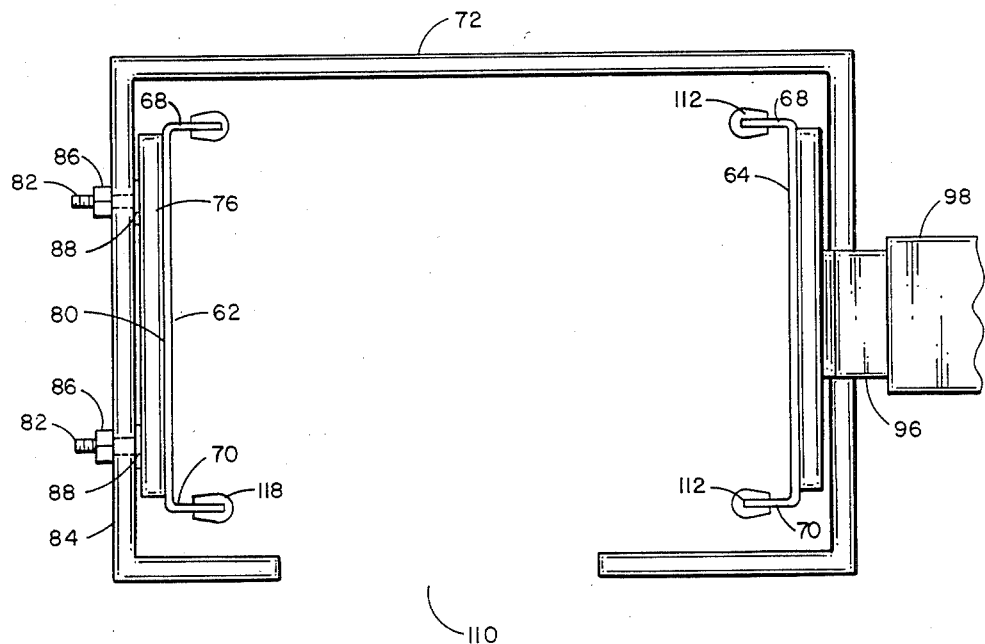
FIG. 5 is a cross-sectional view of the inventive contained trackwork utilized in the conveyor section of FIG. 4.

With reference to FIG. 4 there are illustrated in perspective view, in one form of the invention, several connected segments 58 of contained trackwork suitable for conveying up to 1,500 open ended lightweight cans per minute. Referring also to FIGS. 5 and 6, each trackwork segment 58 comprises first and second elongate "C" shaped guides 62 and 64. The guides 62 and 64 are mirror images of each other and each has a highly polished chrome plated inner surface 66 and a pair of upper and lower angle edges 68 and 70. The edges 68 and 70 are parallel to one another, extending longitudinally along each guide. The guides 62 and 64 are symmetrically aligned with corresponding upper edges 68 and lower edges 70 facing one another in parallel spaced apart relation. Novel C-shaped support collars 72, positioned approximately two feet apart along each guide pair 62 and 64, fasten the guides 62 and 64 into a unified structure. The connected trackwork segments 58, as illustrated in FIG. 4 may be joined to one another with a double support collar 74 formed by welding two individual support collars 72 together. The support collars 72 and 74 may be formed from a continuous section of chrome plated bar steel.

A series of mounting bars 76 are welded to an outer surface 80 of the first guide 62. The bars 76 each include a pair of mounting studs 82 which extend through corresponding mounting holes 83 in a first collar sidewall 84 for securing the first guide 62 to a collar with pairs of fastening nuts 86 and washers 88.

Referring also to the perspective view of FIG. 6, a series of second mounting bars 90 are welded to an outside surface 85 of the second guide 64 for adjustably attaching the second guide 64 to the support collars 72. Each of the second bars 90 include a single mounting stud 82 for attachment to a first arm 94 of an "L" shaped adjustment bracket 96. Each of the collars 72 includes an L-shaped bracket 98 having one arm attached to an outer surface by welding, for example, and a second arm extending outwardly therefrom parallel to an outwardly extending arm of bracket 96. The outwardly extending arm of bracket 98 includes a sleeve 100 through which the outwardly extending arm of bracket 96 can slide. An aperture 102 extends through sleeve 100 and its associated arm of bracket 98. The outwardly extending arm of bracket 96 includes a plurality of selectively spaced apertures 104. A locking pin 106 is provided for extending through a selected aperture 102 and the aperture 104 for establishing a desired fixed spacing between guides 62 and 64. The locking pins 106 are each provided with an attached cable 108, one end of which is fastened to a corresponding one of the studs 82 to thereby prevent loss of the pins.

In this configuration the first and second guides 62 and 64 form a contained track suitable for conveying high speed rolling cans along the lower guide edges 70. It has been determined that slot widths approximately ⅛ inch greater than can diameter provide adequate clearance to permit misaligned cans to freely drop between the lower guide edges 70 and avoid interference with the can procession. In order to prevent the collars 72 from interfering with misaligned cans, they are C-shaped rather than completely closed. This provides an opening 116 between the lower edges 70 of each guide pair 62,64. The upper and lower guide edges 68 and 70 are covered with a slip-on or slide-on coating 112 replaceable low friction plastic material such as ultra high molecular weight polyurethane to form high speed upper and lower runway surfaces.

In operation the cans roll along on the material 112 on the lower guide edge 70. The upper guide edge 68 prevents the cans from jumping out of the trackwork. The highly polished chrome plated inner guide surfaces 66 present relatively low resistance to the open can ends and minimize can misalignment. The novel trackwork 58 incorporates an adjustment means for accommodating various sized cans without requiring the loosening and tightening of nuts and bolts or other time consuming adjustments in order to adjust track members and assure necessary alignment in order to provide a smooth runway surface.

While the preferred embodiment of the invention incorporates a closed track arrangement formed of opposed sheet metal guides 62 and 64, recent developments in can manufacturing now require that multiple types of tracks be available depending upon the type of can be handled. Present day beverage cans are formed by several different processes. More recently, there has been developed a spin flange type of can which has a slight radially outward extending flange formed on the open end of the can during manufacture. The top portion of the can is also tapered inwardly prior to that portion which is outwardly formed. The manufacturing process associated with the spin flange can requires that the can tops be rather heavily waxed for processing. As is apparent, the ability of the cans to move rapidly through the gravity fed conveyor system is affected by wax on the cans. In particular, if the surface making contact with the trackwork is a wax coated surface, the can will tend to bind and leave wax residue on the track. As this wax residue builds up, the ability of the cans to pass along the track is severely impaired. Jams of the can processing then become fairly common requiring regular cleaning of the track and/or constant monitoring in order to quickly clear jammed cans. One solution to the processing of the new types of cans is to adjust the trackwork so that the support for the cans is outside of the waxed area. In general, for spin flange cans, the wax will extend approximately 1¼ inches from the open end of the can. If the support for the can is positioned below the 1¼ inch mark, the waxed portion of the can will not contact the track.

Figure 7:
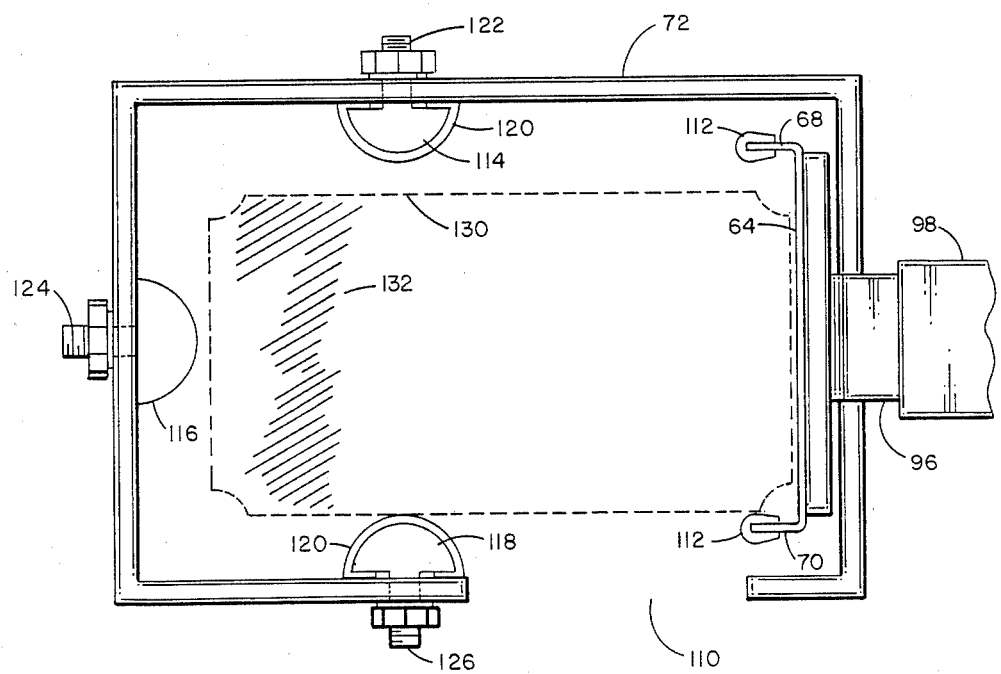
FIG. 7 is an alternate form of the present inventive trackwork adapted for a special type can.

FIG. 7 is an illustration of a combined open and closed trackwork suitable for handling spin flange type cans. A can is indicated by phantom lines 130 with a wax coating at 132. In this arrangement, the adjustable portion of the trackwork is identical to that disclosed in FIGS. 4, 5 and 6, i.e., it includes the guide 64 which presents a highly polished sheet metal face to at least one end of the can. Since the intent is to avoid support of the can near the wax area, it will be apparent that the sheet metal guide 64 will be positioned so that the bottom end of the can is adjacent to that guide. The remaining guide is comprised of half round rods of the type previously used for open type trackwork. In the illustrative embodiment, two half-round guides 114 and 118 are provided, each of which is covered with the well known polyurethane material to reduce friction between the can and the guide rails. The open end of can 130 faces a third half-round guide 116 which is hard chrome plated and polished so as to minimize friction between the open sharp can edge and guide 116. As is illustrated, each of the half round guiderails 114, 116 and 118 are attached to the C-shaped bracket 72 by means of studs 122, 124 and 126 in a manner well known in the art. The guide rails 114 and 118 are positioned towards the center of the bracket 72 so that the support provided to the can is moved away from its open end and out of the area of the can which is heavily waxed. The guide rail 116 provides a surface for maintaining the can within the trackwork. While the arrangement of FIG. 7 is not considered to be the best arrangement for high speed can handling, it does overcome the problems associated with handling of spin flange cans.

In both the embodiment of FIG. 6 and of FIG. 7, it can be seen that the bracket 72 is provided with a sufficiently wide opening 110 at its lower end to allow cans to drop out of the trackwork when they become damaged and misaligned within the track. The opening 110 is preferably at least ⅛ inch wider than the diameter of any can processed through the trackwork. Of course, the wider the opening 110 with respect to the diameter of the can, the more likely the can will fall out of the trackwork when it is misaligned.

The trackwork of the present invention incorporating the opposed sheet metal guides 62, 64 has been tested and found to work efficiently at can speeds exceeding 1,100 cans per minute. Extensive testing has verified that the contained trackwork of the present invention minimizes the number of misalignments of cans and also permits misaligned cans to drop out of the trackwork without creating jams and halting the production line.

The principles of the present invention having now been set forth, it will be apparent to those skilled in the art that certain modifications in structure, components and arrangements of components illustrated herein may be made in the practice of the invention and for the adaptation of the invention to specific applications without departing from the spirit and scope of the invention as defined by the claims which follow.

I claim:

1. Contained trackwork for a high speed gravity feed rolling can conveyor comprising:
   a first elongate "C" shaped guide having a first inside surface, a first outside surface and upper and lower first angled edges, the upper and lower edges being parallel to one another and extending inwardly of the conveyor;
   a second elongate "C" shaped guide having a second inside surface, a second outside surface and upper and lower second angled edges, the upper and lower second edges being parallel to one another and extending inwardly of the conveyor, said second guide being in parallel spaced apart relation to the first guide, the first and second inside surfaces facing one another, said guides forming at least a lower slot between the first and second lower guide edges, said guides being adapted to contain rolling cans transversely aligned with said guides, with the first and second lower guide edges adapted to support a rolling can edge; and
   open collar means for securing said first and second guides in spaced apart relation and for permitting misaligned cans to freely drop between the first and second lower guide edges, said open collar means comprising a plurality of support collars positioned along said first and second guides, each collar comprising first and second connected sidewalls, each of said collars being "C" shaped and having an open end positioned below the first and second lower guide edges to permit misaligned cans to freely drop out of said trackwork, said first guide being secured along its first outside surface to the first collar sidewall; and means for adjustably securing said second guide along its second outside surface to the second collar sidewall.

2. A can conveyor section comprising:

a sheet metal guide having a substantially planar elongate section of width slightly greater than a diameter of a can to be conveyed, opposed edges across the width of the guide being formed inwardly of the conveyor section and substantially perpendicular of the elongate section, at least one of the edges forming a rolling can support when the elongate section is vertically oriented;

means for supporting an end of the can opposite an end supported by said sheet metal guide;

a support collar for adjustably securing the guide within the conveyor section, the collar having a segment extending in a plane substantially parallel to a plane of the elongate section across the width thereof and a first bracket extending from the collar outwardly of the conveyor section;

a second bracket attached to a surface of the sheet metal guide outward of the conveyor section, the second bracket being adjacent and extending parallel to the first bracket, each of the first and second bracket having at least one aperture extending therethrough; and a locking pin for securing the guide to the collar when the pin is inserted through the aperture in each of the first and second bracket.

3. The can conveyor section of claim 2 and including a plurality of apertures in at least one of the first and second bracket, each of the plurality of apertures being selectively alignable with an aperture in the other of the brackets for spacially positioning the guide in the conveyor section.

4. The can conveyor section of claim 3 wherein said means for supporting said opposite can end comprises a second sheet metal guide forming substantially a mirror image of the first guide, the second guide being fixedly attached to the support collar and having an edge oriented for supporting an end of a rolling can.

5. The can conveyor section of claim 4 and including a polyurethane coating over each of the edges of the guides.

6. The can conveyor section of claim 4 wherein the collar has substantially a C-shaped configuration defining an opening aligned with a spacing between the first and the second guide, the opening being wider than a diameter of a can to be rolled through the conveyor section.

7. Contained trackwork for a high speed gravity feed rolling can conveyor comprising:

a first elongate "C" shaped guide having a first inside surface, a first outside surface and upper and lower first angled edges, the upper and lower edges being parallel to one another and extending inwardly of the conveyor;

a second elongate "C" shaped guide having a second inside surface, a second outside surface and upper and lower second angled edges, the upper and lower second edges being parallel to one another and extending inwardly of the conveyor, said second guide being in parallel spaced apart relation to the first guide, the first and second inside surfaces facing one another, said guides forming at least a lower slot between the first and second lower guide edges, said guides being adapted to contain rolling cans transversely aligned with said guides, with the first and second lower guide edges adapted to support a rolling can edge;

open collar means for securing said first and second guides in spaced apart relation and for permitting misaligned cans to freely drop between the first and second lower guide edges, said open collar means comprising a plurality of support collars positioned along said first and second guides, each of said collars comprising first and second connected sidewalls, said first guide being secured along its first outside surface to the first collar sidewall; and means for adjustably securing said second guide along its second outside surface to the second collar of the sidewall, said adjustment means comprising a plurality of adjustment brackets, each secured to the second outside surface of said second guide adjacent the collar, said collars each comprising an adjustment sleeve attached to the second collar sidewall, each sleeve being adapted to receive an adjustment bracket for securing said second guide in a selectable position with respect to said first guide, each adjustment sleeve including an aperture and each adjustment bracket including at least one corresponding aperture alignable with the sleeve aperture when said bracket is positioned in said sleeve, said trackwork further including a plurality of locking pins, each pin being positionable through the aligned sleeve and bracket apertures for locking each adjustment bracket in place and securing said second guide in a selectable position with respect to said first guide.

* * * * *